United States Patent
Zhang et al.

(10) Patent No.: US 12,363,746 B2
(45) Date of Patent: Jul. 15, 2025

(54) METHODS AND ENHANCEMENTS FOR INTER-CELL INTERFERENCE MITIGATION

(71) Applicant: Apple Inc., Cupertino, CA (US)

(72) Inventors: Yushu Zhang, Beijing (CN); Manasa Raghavan, Sunnyvale, CA (US); Dawei Zhang, Saratoga, CA (US); Haitong Sun, Cupertino, CA (US); Huaning Niu, San Jose, CA (US); Jie Cui, San Jose, CA (US); Qiming Li, Beijing (CN); Rajarajan Balraj, Nuremberg (DE); Xiang Chen, Campbell, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/773,875

(22) PCT Filed: Sep. 24, 2021

(86) PCT No.: PCT/CN2021/120480
§ 371 (c)(1),
(2) Date: May 3, 2022

(87) PCT Pub. No.: WO2023/044817
PCT Pub. Date: Mar. 30, 2023

(65) Prior Publication Data
US 2024/0179734 A1 May 30, 2024

(51) Int. Cl.
*H04W 72/541* (2023.01)
*H04W 72/0446* (2023.01)
*H04W 72/0453* (2023.01)

(52) U.S. Cl.
CPC ..... *H04W 72/541* (2023.01); *H04W 72/0446* (2013.01); *H04W 72/0453* (2013.01)

(58) Field of Classification Search
CPC ........... H04W 72/541; H04W 72/0446; H04W 72/0453; H04L 5/0073; H04L 5/0044; H04L 5/0048; H04L 5/0091
See application file for complete search history.

(56) References Cited

U.S. PATENT DOCUMENTS

| | | | |
|---|---|---|---|
| 2015/0078191 A1* | 3/2015 | Jongren | H04L 1/0026 370/252 |
| 2015/0098440 A1* | 4/2015 | Yang | H04L 5/0051 370/330 |

(Continued)

FOREIGN PATENT DOCUMENTS

| CN | 105723641 A | 6/2016 |
|---|---|---|
| CN | 106464322 A | 2/2017 |
| CN | 107295686 A | 10/2017 |

OTHER PUBLICATIONS

PCT Search Report dated Feb. 16, 2022 in connection with PCT Application No. PCT/CN2021/120480.

(Continued)

*Primary Examiner* — Rina C Pancholi
(74) *Attorney, Agent, or Firm* — Eschweiler & Potashnik, LLC (57) ABSTRACT

Techniques discussed herein can facilitate inter-cell interference mitigation. One example aspect is a user equipment (UE), configured to receive a network assistance indication associated with an interfering signal, where the interfering signal interferes with a physical downlink shared channel (PDSCH) transmission. A time resource allocation of the interfering signal is different than a time resource allocation of the PDSCH transmission. The UE is further configured to determine an interference and noise covariance estimation mechanism based on the network assistance indication then perform interference and noise covariance estimation based on the noise covariance estimation mechanism. The UE is (Continued)

further configured to perform mitigation of the interfering signal using a mitigation mechanism based on the interference and noise covariance estimation.

30 Claims, 6 Drawing Sheets

(56) References Cited

U.S. PATENT DOCUMENTS

| | | | |
|---|---|---|---|
| 2015/0365154 A1* | 12/2015 | Davydov | H04W 72/23 |
| | | | 370/329 |
| 2015/0373569 A1* | 12/2015 | Hwang | H04J 11/0023 |
| | | | 370/235 |
| 2017/0006501 A1* | 1/2017 | Sesia | H04W 28/18 |
| 2018/0278391 A1* | 9/2018 | Zhang | H04L 5/0053 |
| 2019/0356364 A1 | 11/2019 | Maamari et al. | |
| 2020/0304232 A1* | 9/2020 | Park | H04L 5/0096 |
| 2022/0311571 A1* | 9/2022 | Cheng | H04L 5/005 |
| 2022/0338025 A1* | 10/2022 | Gao | H04W 16/28 |

OTHER PUBLICATIONS

PCT Written Opinion dated Mar. 23, 2022 in connection with PCT Application No. PCT/CN2021/120480.

* cited by examiner

METHODS AND ENHANCEMENTS FOR INTER-CELL INTERFERENCE MITIGATION

This application is a National Phase entry application of International Patent Application No. PCT/CN2021/120480 filed Sep. 24, 2021, entitled "METHODS AND ENHANCEMENTS FOR INTER-CELL INTERFERENCE MITIGATION", the contents of which are herein incorporated by reference in their entirety.

FIELD

The present disclosure relates to wireless technology including New Radio (NR) transmission inter-cell interference mitigation including a system and method for physical downlink shared channel (PDSCH) interference and noise mitigation.

BACKGROUND

Mobile communication in the next generation wireless communication system, 5G, or new radio (NR) network will provide ubiquitous connectivity and access to information, as well as the ability to share data, around the globe. 5G networks and network slicing will be a unified, service-based framework, that will target to meet versatile, and sometimes conflicting, performance criteria. 5G networks will provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

DETAILED DESCRIPTION 5G or NR networks may use flexible physical downlink shared channel (PDSCH) scheduling where PDSCH allocations can be various symbols in length, for example, 2 to 14 symbols. A base station (BS) of a network (NW) can configure PDSCH resources for different user equipments (UEs) where the PDSCH resources are of different symbol allocations (e.g. different symbol lengths) and where the PDSCH resources can start at different symbols relative to one another (e.g. a first PDSCH transmission starting at symbol 2 of a slot and a second PDSCH transmission starting at symbol 4 of the slot). In some aspects, the PDSCH resources can cause interference for the different UEs. For example, a PDSCH transmission allocated for a target UE is subject to interference from a PDSCH transmission of another UE. The PDSCH transmission of another UE can be referred to as an interfering PDSCH transmission, where the interfering PDSCH transmission interferes with the PDSCH transmission allocated for the target UE.

A PDSCH demodulation reference signal (DMRS) for the PDSCH transmission can be used by the target UE for noise and interference covariance estimation. The target UE can use the noise and interference covariance estimation to perform mitigation (e.g. interference rejection/interference mitigation) of the interfering PDSCH transmission. However, in some aspects, the PDSCH DMRS does not overlap with the interfering PDSCH transmission and the UE is unable to perform mitigation of the interfering PDSCH transmission based on the PDSCH DMRS. In other aspects, the PDSCH DMRS may overlap with the interfering PDSCH transmission and may not indicate temporal information regarding the interfering PDSCH transmission relative to the PDSCH transmission. For example, the target UE is unable to identify if the interfering PDSCH transmission starts or the ends before or after the PDSCH transmission or the length of the interfering PDSCH transmission based on a single overlap of the PDSCH DMRS and the interfering PDSCH transmission. While the target UE may receive a PDSCH DMRS that overlaps with the interfering PDSCH transmission, without temporal information regarding the interfering PDSCH transmission as related to the PDSCH transmission, the target UE may perform interference rejection or mitigation in a sub-optimal manner or in a manner that reduces the gain of the PDSCH transmission.

Various aspects of the present disclosure are directed towards utilizing network assistance information from the BS to inform the target UE of interferers that can come from neighboring interfering cells. Mechanisms by which the target UE can use network assistance from the BS to perform noise and interference covariance estimation and mitigation are presented herein. Furthermore, mechanisms by which the target UE performs advanced processing by determining interference loading for each symbol of the PDSCH transmission, and subsequently performing interference covariance estimation and mitigation are presented herein. Mechanisms presented herein improve the reception quality of the PDSCH transmission for the target UE by mitigating signals that interfere with the PDSCH transmission.

In some aspects, the target UE receives a network assistance indication associated with an interfering signal where the interfering signal interferes with a PDSCH transmission. The network assistance indication is received from a BS for the purpose of assisting the target UE with mitigation of the interfering signal. In some aspects, the network assistance information relates to the time domain resource assignment (TDRA) of the interfering signal. A time resource allocation of the interfering signal is different than a time resource allocation of the PDSCH transmission forming un-even interference. The network assistance indication can be included in a radio resource control (RRC) message or a downlink control information (DCI) and transmitted by a BS. The target UE determines an interference and noise covariance estimation based on the network assistance indication. The target UE performs interference and noise covariance estimation based on the noise covariance estimation mechanism. A mitigation mechanism is determined based on the interference and noise covariance estimation and mitigation is performed using the mitigation mechanism to reject interference from the interfering signal.

As such, the target UE uses network assistance information from the BS to mitigate the interfering signal where the time resource allocation of the interfering signal and the PDSCH transmission are different. The signal quality of the PDSCH transmission is thereby improved for the target UE.

In other aspects, the target UE does not receive network assistance and makes a determination to perform advanced UE processing to mitigate an interfering signal where the interfering signal interferes with the PDSCH transmission. The interfering signal and PDSCH transmission can form un-even interference. As such, the target UE performs an interference loading determination of the PDSCH transmission symbols to characterize the interfering signal. The target UE can determine to perform the interference loading determination based on an interference indication by the BS, or autonomously. The target UE uses an interference covariance estimation based on the interference loading determination and subsequently performs mitigation of the interfering signal.

As such, the target UE performs advanced UE processing by performing interference loading determination to characterize and mitigate the interfering signal where the time resource allocation of the interfering signal and the PDSCH transmission are different. The signal quality of the PDSCH transmission is thereby improved for the target UE.

Additional aspects and details of the disclosure are further described below with reference to figures.

Figure 1:
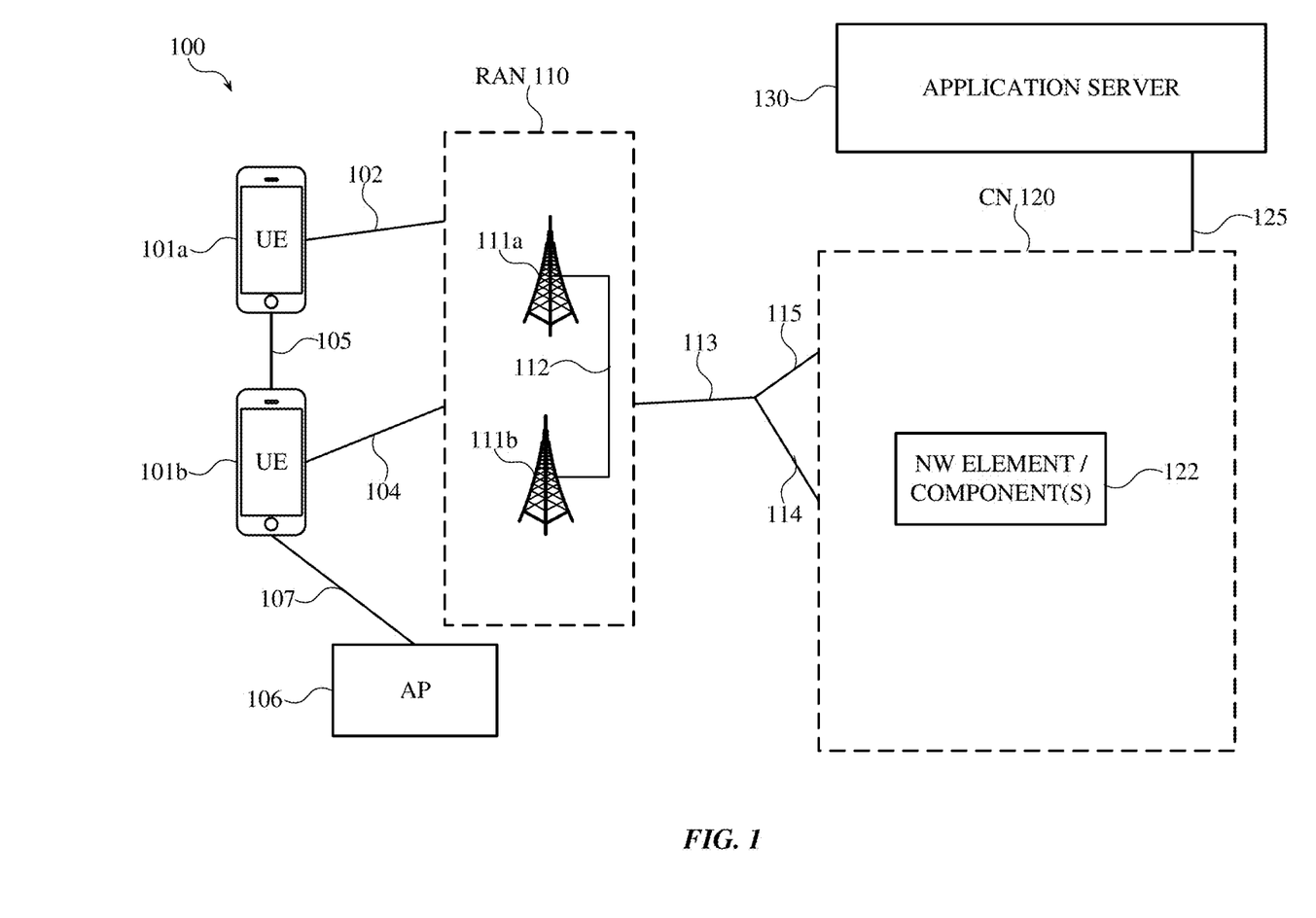
FIG. 1 is an exemplary block diagram illustrating an example of user equipment(s) (UEs) communicatively coupled to a network in accordance with various aspects described herein.

FIG. 1 illustrates example architecture of a wireless communication system 100 of a network that includes UE 101a and UE 101b (collectively referred to as "UEs 101" or "UE 101"), a radio access network (RAN) 110, and a core network (CN) 120. The UEs communicate with the CN 120 by way of the RAN 110. In aspects, the RAN 110 can be a next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 110 that operates in an NR or 5G system 100, and the term "E-UTRAN" or the like can refer to a RAN 110 that operates in an LTE or 4G system 100. The UEs 101 utilize connections (or channels) 102 and 104, respectively, each of which comprises a physical communication interface/layer.

Alternatively, or additionally, each of the UEs 101 can be configured with dual connectivity (DC) as a multi-RAT or multi-Radio Dual Connectivity (MR-DC), where a multiple Rx/Tx capable UE may be configured to utilize resources provided by two different nodes (e.g., 111a, 111b, 112, or other network nodes) that can be connected via non-ideal backhaul, one providing NR access and the other one providing either E-UTRA for LTE or NR access for 5G, for example.

Alternatively, or additionally, each of the UEs 101 can be configured in a CA mode where multiple frequency bands are aggregated amongst CCs to increase the data throughput between the UEs 101 and the nodes 111a, 111b. For example, UE 101a can communicate with node 111a according to the CCs in CA mode. Furthermore, UE 101a can communicate with nodes 112 in a DC mode simultaneously and additionally communicate with each node of nodes 112 in the CA mode.

In this example, the connections 102 and 104 are illustrated as an air interface to enable communicative coupling. In aspects, the UEs 101 can directly exchange communication data via a ProSe interface 105. The ProSe interface 105 can alternatively be referred to as a sidelink (SL) interface 105 and can comprise one or more logical channels.

The RAN 110 can include one or more access nodes or RAN nodes 111a and 111b (collectively referred to as "RAN nodes 111" or "RAN node 111") that enable the connections 102 and 104. As used herein, the terms "access node," "access point," or the like can describe equipment that provides the radio baseband functions for data and/or voice connectivity between a network and one or more users. These access nodes can be referred to as a base station (BS), next generation base station (gNBs), RAN nodes, evolved next generation base station (eNBs), NodeBs, RSUs, Transmission Reception Points (TRxPs) or TRPs, and so forth.

In aspects where the system 100 is a 5G or NR system, a node of the nodes 112 can be an Xn interface. The Xn interface is defined between two or more RAN nodes 111 (e.g., two or more gNBs and the like) that connect to CN 120 (also referred to as 5GC), between a RAN node 111 (e.g., a gNB) connecting to 5GC and an eNB, and/or between two eNBs connecting to 5GC.

The RAN 110 is shown to be communicatively coupled to a core network—in this aspect, CN 120. The CN 120 can comprise a plurality of network elements 122, which are configured to offer various data and telecommunication services to customers/subscribers (e.g., users of UEs 101) who are connected to the CN 120 via the RAN 110.

In some aspects, physical downlink shared channel (PDSCH) signaling may carry user data and higher layer signaling to UEs 101. The physical downlink control channel (PDCCH) may carry information about the transport format and resource allocations related to the PDSCH channel, among other things. The PDCCH may also inform UEs 101 about the transport format, resource allocation, and hybrid automatic repeat request (HARQ) information related to the uplink shared channel. Typically, downlink scheduling (e.g., assigning control and shared channel resource blocks to UE 110-2 within a cell) may be performed at any of the RAN 110 based on channel quality information fed back from any of UEs 101. The downlink resource assignment information may be sent on the PDCCH used for (e.g., assigned to) each of UEs 101.

Enhanced Inter-Cell Interference Mitigation

Figure 2:
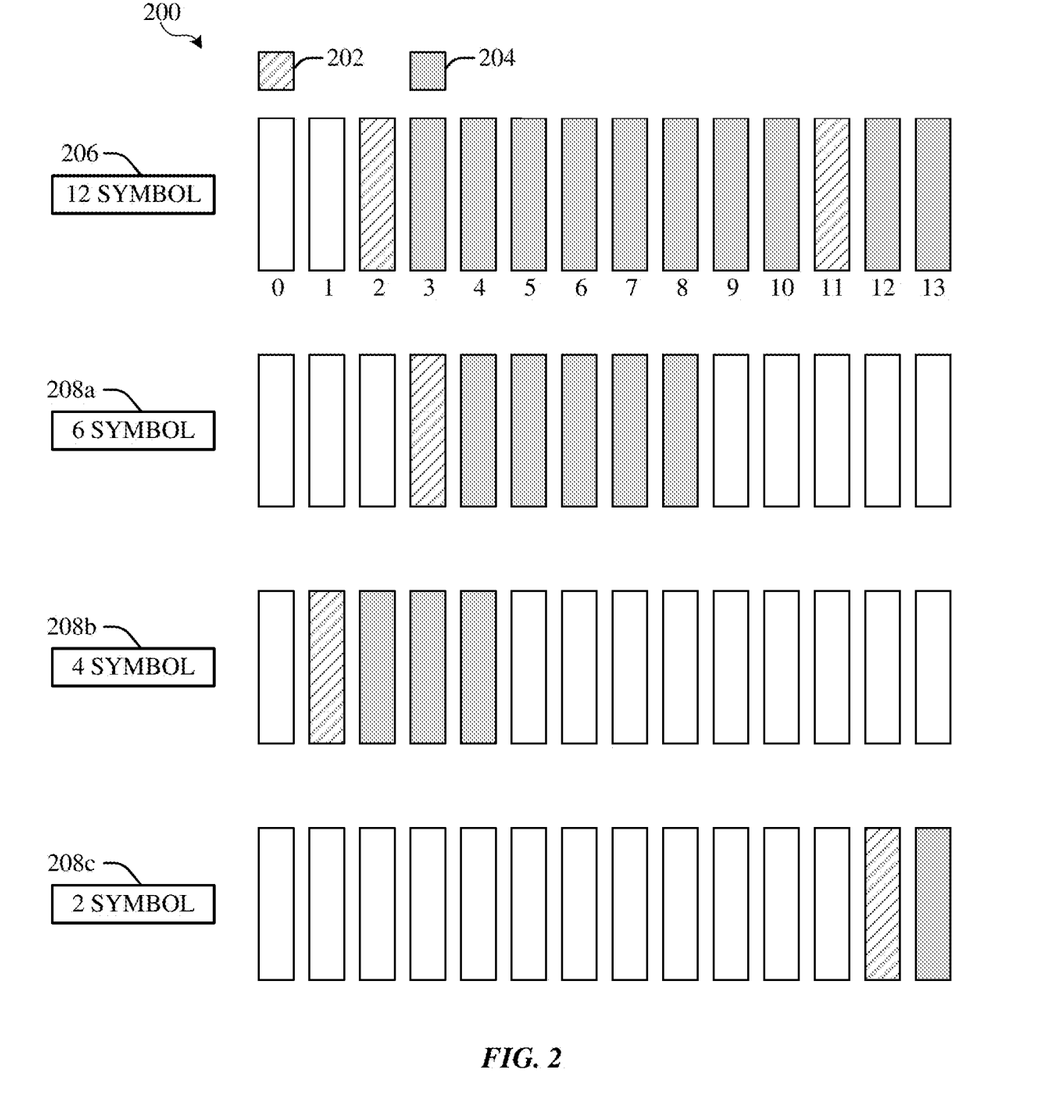
FIG. 2 is a resource allocation diagram of different physical downlink shared channel (PDSCH) signals, in accordance with various aspects disclosed herein.

FIG. 2 is a resource allocation diagram 200 of different PDSCH transmissions, in accordance with various aspects disclosed herein. In some aspects, the wireless communication system 100 of FIG. 1 supports flexible PDSCH scheduling where PDSCH allocations can be various symbols in length, for example 2 to 14 symbols. The PDSCH scheduling can include one or more of a PDSCH symbol 204 or PDSCH DMRS symbol 202. The resource allocation diagram 200 shows various PDSCH scheduling examples including 12 symbol, 6 symbol, 4 symbol, and 2 symbol PDSCH allocations. In general, the different PDSCH transmissions can be used to transfer user application data, system information, signaling radio bearer messages, paging messages, control information, and DMRS, from the BS 111 to a UE 101. The PDSCH DMRS of a PDSCH transmission 206 for a target UE can be used by the target UE to mitigate an interfering signal. For example, the PDSCH DMRS are known sequences to the target UE 101. The target UE 101 compares the received PDSCH DMRS sequence to the known sequence to estimate the impact of the propagation channel. The target UE can apply the inverse of the propagation channel during demodulation to decode the PDSCH transmission 206 thereby mitigating any interfering signals.

In some aspects, the BS 111 of a NW (e.g. RAN 110, CN 120 of FIG. 1) configures the PDSCH transmission 206 for the target UE 101. Additionally the NW configures a PDSCH transmission of another UE 101b. In some aspects, a signal interferes with the PDSCH transmission 206 and is an interfering signal or also referred to as an interferer. The interfering signal can be any interface that diminishes the quality of the PDSCH transmission 206. In some aspects the PDSCH transmission of another UE can interfere with the PDSCH transmission 206. As such, the PDSCH transmission of another UE can be referred to individually as interfering PDSCH transmission 208a, interfering PDSCH transmission 208b, or interfering PDSCH transmission 208c (collectively referred to as "interfering PDSCH transmission 208"). In other aspects, the interfering signal is a plurality of interfering signals and as such could be a plurality of interfering PDSCH transmission 208a, 208b, and 208c (collectively referred to as "interfering PDSCH transmissions 208"). For purposes of illustration the PDSCH transmission 206 is depicted with a 12 symbol allocation comprising symbols 2 through 13 of a slot. In other examples, the PDSCH transmission 206 can comprise any symbol allocation (not depicted) between 2 and 14 symbols, or some other symbol length allocated by a PDSCH communication protocol between the target UE 101 and the BS 111. Additionally, the PDSCH transmission 206 can be configured with a PDSCH DMRS. For purposes of illustration the PDSCH transmission 206 is depicted with a PDSCH DMRS at symbols 2 and 11. The PDSCH transmission 206 is not limited in this respect and can have more or less PDSCH DMRS at different symbol locations which are dependent on the symbol allocation of the PDSCH transmission 206.

Interfering PDSCH transmission 208 can comprise one of various resource allocations. For example, interfering PDSCH transmission 208a comprises a 6 symbol allocation beginning at symbol 3. Furthermore, interfering PDSCH transmission 208a can comprise an interfering PDSCH DMRS at symbol 3. Alternatively interfering PDSCH transmission 208b comprises a 4 symbol allocation beginning at symbol 1 with the interfering PDSCH DMRS at symbol 1. In a last example, interfering PDSCH transmission 208c can comprise a 2 symbol allocation beginning at symbol 12 with the interfering PDSCH DMRS at symbol 12. Interfering PDSCH transmission 208 is not limited with regard to the various allocations described above and can comprise any symbol allocation between 2 and 14 symbols, or some other symbol length allocated by the PDSCH communication protocol between the another UE 101a and the NW.

Based on the possible configurations of the PDSCH transmission 206 and the interfering PDSCH transmission 208, differing interference conditions can arise where the target UE 101 would benefit from mitigation (e.g. interference rejection/interference mitigation) of the interfering PDSCH transmission 208.

A first interference condition can occur when the PDSCH transmission 206 and the interfering PDSCH transmission 208 are of the same symbol length and start at the same symbol location (not depicted). The first interference condition can be described as "even interference."

A second interference condition can occur when the PDSCH transmission 206 and interfering PDSCH transmission 208 are of different symbol allocations (or referred to as different time resource allocations), and where the PDSCH DMRS of the PDSCH transmission 206 does not overlap with the interfering PDSCH transmission 208. Non-limiting examples of the second interference condition are seen in PDSCH transmission 206 and the 6 symbol interfering PDSCH transmission 208a or the 2 symbol interfering PDSCH transmission 208c where PDSCH DMRS at symbols 2 and 11 of the 12 symbol PDSCH transmission 206 do not overlap with the interfering PDSCH transmission 208a, 208c.

A third interference condition can occur when the PDSCH transmission 206 and interfering PDSCH transmission 208 are of different or the same symbol allocations and have different starting symbol locations (also referred to as different time resource allocations) where the interfering signal begins earlier than the PDSCH transmission 206 or the interfering signal ends after the PDSCH transmission 206. A non-limiting example of the third interference condition is seen in PDSCH transmission 206 and the 4 symbol interfering PDSCH transmission 208b where the PDSCH transmission 206 starts at symbol 2 and the interfering PDSCH transmission 208b starts at symbol 1. In this example the PDSCH DMRS of the PDSCH transmission 206 overlaps with the interfering PDSCH transmission 208b at symbol 2. In other examples, the PDSCH DMRS of the PDSCH transmission 206 does not overlap with the interfering PDSCH transmission 208.

The second and third interference conditions can be described as examples of "un-even interference."

In some aspects, the target UE can mitigate the first interference condition by using the PDSCH DMRS to perform noise and interference covariance estimation and then mitigate the interfering PDSCH transmission.

In other aspects, the target UE cannot mitigate the second or third interference conditions by using the PDSCH DMRS because the PDSCH DMRS does not overlap with the interfering PDSCH transmission 208. As such, the characteristics of the interfering PDSCH transmission 208 are not known to the target UE 101, and the interfering PDSCH transmission 208 degrades the signal quality of the PDSCH transmission 206. In some aspects, the PDSCH DMRS overlaps with the interfering PDSCH transmission 208, however, because the PDSCH transmission 206 and the interfering PDSCH transmission 208 are un-even with regards to having different time resource allocations, the PDSCH DMRS may not provide the target UE 101 with information regarding which symbols of the PDSCH transmission 206 see interference and thus which symbols of the target UE 101 can perform mitigation.

In view of the second and third interference conditions, the target UE 101 can use a network assistance indication from the BS 111 to assist the target UE 101 with mitigating the interfering PDSCH transmission 208, or any other interfering signals, as seen in the various aspects presented herein. Alternatively, the target UE 101 can perform advanced processing to determine the interface loading for each symbol of the PDSCH transmission 206 and perform mitigation autonomously as seen in the various aspects presented herein.

Figure 3:
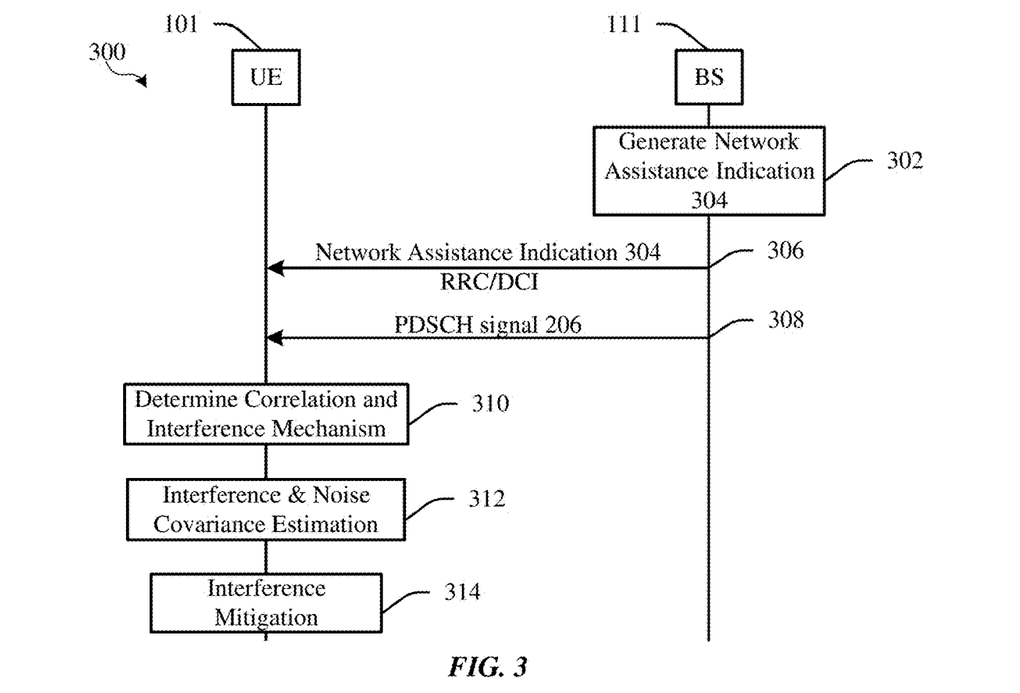
FIG. 3 is a signal flow diagram outlining an example of network assisted inter-cell interference mitigation.

FIG. 3 is a signal flow diagram 300 outlining an example of network assisted inter-cell interference mitigation. In the signal flow diagram 300 a target UE 101 uses network assistance from a BS 111 to mitigate an interfering signal that interferes with a PDSCH transmission 206 for the target UE 101. In some aspects, the interfering signal can be the interfering PDSCH transmission 208 as described previously. A time resource allocation of the interfering signal can be different than a time resource allocation of the PDSCH transmission 206. In this respect, the resource allocation of the PDSCH transmission 206 and interfering signal result in un-even interference. In other aspects, the resource allocation of the PDSCH transmission 206 and interfering signal result in even interference.

The BS 111 can coordinate with a NW (e.g. RAN 110, CN 120 of FIG. 1) to determine a resource allocation of the interfering signal that interferes with the PDSCH transmission 206. At 302, the BS 111 generates a network assistance indication 304 that indicates resource information of the interfering signal. As such, the network assistance indication is associated with the interfering signal.

The network assistance indication 304 can indicated various characteristics of the interfering signal. For example, the network assistance indication 304 can indicate a time domain resource assignment (TDRA) of the interfering signal. As such, the network assistance indication 304 indicates the time resource allocation of the interfering signal. Additionally or alternatively, the network assistance indication 304 can indicate a frequency domain resource allocation (FDRA) of the interfering signal and the network assistance indication 304 indicates the frequency resource allocation of the interfering signal. The TDRA can indicate to the target UE 101 what symbol the interfering signal is located. The FDRA can indicate to the target UE 101 physical resource block (PRB) the interfering signal is located.

In some aspects the network assistance indication 304 can indicate a channel state information interference measurement (CSI-IM) resource associated with the resource allocation of the interfering signal. The BS 111 can generate the network assistance indication 304 where CSI-IM resources are configured for every symbol where interference occurs between the interfering signal and the PDSCH transmission 206. In other aspects CSI-IM resources are configured to match the interfering signal on a per symbol basis. For example, the BS 111 configures the CSI-IM resources for each symbol where the PDSCH transmission 206 and the interfering signal overlap. As such, the CSI-IM resources can be associated with symbols or slots of the PDSCH transmission that overlap with the interfering signal.

In some aspects the network assistance indication 304 can indicate a phase tracking reference signal (PT-RS) associated with the resource allocation of the interfering signal. The BS 111 can generate the network assistance indication 304 where a PT-RS is configured in one or more of frequency range 1 (FR1) or frequency range 2 (FR2). Furthermore, the PT-RS can be configured to be transmitted every two or four PRBs in the frequency domain. Additionally or alternatively, the PT-RS can be transmitted in the time domain every symbol, two symbols, or four symbols. Thus, the BS 111 can configure the PT-RS in a suitable manner to ensure the PT-RS overlaps with the interfering signal or to ensure that the target UE 101 can estimate the effects of the interfering signal.

In some aspects the network assistance indication 304 can indicate a PDSCH DMRS associated with the resource allocation of the interfering signal. The BS 111 can configure a PDSCH DMRS of the PDSCH transmission 206 for symbols of the interfering signal and PDSCH transmission 206 that overlap.

In some aspects the network assistance indication 304 can indicate blank resource elements (REs) associated with the resource allocation of the interfering signal. For example, the blank REs can be associated with subframes or symbols of the PDSCH transmission that overlap with the interfering signal.

The network assistance indication 304 can include one or more of the above recited features including the TDRA, FDRA, CSI-IM resource, PT-RS, PDSCH DMRS, or blank RE.

At 306 the BS 111 transmits the network assistance indication 304 to the target UE 101. The network assistance indication 304 can be included in a radio resource control (RRC) message or a downlink control information from the BS 111. The target UE 101 then receives the network assistance indication 304.

In aspects where one or more of the CSI-IM resource, PT-RS, PDSCH DMRS, or blank RE are indicated by the network assistance indication 304, and TDRA or FDRA are not indicated, the network assistance indication 304 may not be carried by the RRC message or DCI. For example, the CSI-IM resource may be indicated with a CSI reference signal (CSI-RS). The PT-RS may be indicated in a PDSCH channel of the PDSCH transmission 206. The PDSCH DMRS may be indicated in a symbol of the PDSCH transmission 206. The blank RE may be configured within the PDSCH configuration of the PDSCH transmission 206.

In aspects where one or more of the CSI-IM resource, PT-RS, PDSCH DMRS, or blank RE are indicated in addition to the TDRA and/or FDRA, the CSI-IM resource, PT-RS, PDSCH DMRS, or blank RE may be indicated to the target UE 101 in the same manner discussed above for the aspect where TDRA or FDRA are not indicated. In other aspects, one or more of the CSI-IM resource, PT-RS, PDSCH DMRS, or blank RE are indicated in a RRC message, DCI, or other signaling.

At 308 the BS 111 transmits and the target UE 101 receives the PDSCH transmission 206. In some aspects the PDSCH transmission 206 can be transmitted by the BS 111 and received by the target UE 101 before, during, or after the network assistance indication 304 is transmitted by the BS 111 and received by the target UE 101 at 306.

After receiving the network assistance indication 304 at 306, the target UE 101 can use the network assistance indication 304 to correlate the resource allocation of the interfering signal with a resource allocation of the PDSCH transmission 206 at 310. Correlation of the resource allocation of the interfering signal with the resource allocation of the PDSCH transmission 206 can include one or more of time resource correlation and frequency resource correlation. In some aspects, correlation includes correlating symbols of the PDSCH transmission 206 to overlapping resource allocation of the interfering signal. In some aspects, every symbol of the PDSCH transmission 206 is correlated to any overlapping resource allocation of the interfering signal. For example, correlation of any symbols of the PDSCH transmission 206 of FIG. 2 that may overlap with any symbols of the interfering PDSCH transmission 208 of FIG. 2 which may be even interference or un-even interference.

If the network assistance indication 304 indicates a CSI-IM resource, the target UE 101 would perform interference measurements according to the CSI-IM resource as part of the correlation of the resource allocation of the interfering signal with the resource allocation of the PDSCH transmission 206.

Additionally, at 310, the target UE 101 can determine the type of interference mechanism between the interfering signal and the PDSCH transmission 206. For example, if a PDSCH DMRS resource element (RE) of the PDSCH transmission 206 overlaps with the interfering signal, the target UE 101 can determine the interference mechanism to be DMRS based. Alternatively or additionally the target UE 101 can determine that PDSCH resource elements of the PDSCH transmission 206 overlaps with the interfering signal, the target UE 101 can determine the interference mechanism to be data based. As such, the target UE 101 can determine an interference and noise covariance estimation mechanism based on the determined interference mechanism. For example, the interference and noise covariance estimation mechanism can be DMRS based or data based. The interference and noise covariance estimation mechanism can be determined according to a number of factors that include a pattern of the interferer, a time/frequency characteristic of the interferer, or the like. The target UE 101 can perform interference and noise covariance estimation at 312 based on the interference and noise covariance estimation mechanism. In some aspects, the target UE 101 performs the interference and noise covariance estimation to determine interference levels for every PRB and/or symbol of the PDSCH transmission 206. In some aspects, the target UE 101 determines an interference loading of one or more of symbols, PRBs, or subcarriers associated with the PDSCH transmission 206.

At 314 the target UE 101 determines an interference mitigation mechanism and performs interference mitigation of the interfering signal based on the interference mitigation mechanism. In some aspects the interference mitigation mechanism is based on the interference and noise covariance estimation. The target UE 101 can determine the interference mitigation mechanism based on the determined interference loading. For example, if the interference loading satisfies an interference loading threshold, the mitigation mechanism can include an interference and noise covariance estimate applied on a per symbol or PRB basis of the PDSCH transmission 206. If the interference loading does not satisfy the interference loading threshold, a same noise covariance matrix can be used as the mitigation mechanism for all symbols or PRBs. In other aspects the mitigation mechanism can include applying interference rejection or mitigation on symbols, REs, or sub carriers of the PDSCH transmission 206 that are determined through, the interference and noise covariance estimation, to have an interferer that satisfies an interference threshold.

In conclusion of 314, the target UE 101 makes use of network assistance in the form of a network assistance indication to mitigate interference associated with the PDSCH transmission 206 thereby improving the signal quality of the PDSCH transmission 206.

Figure 4:
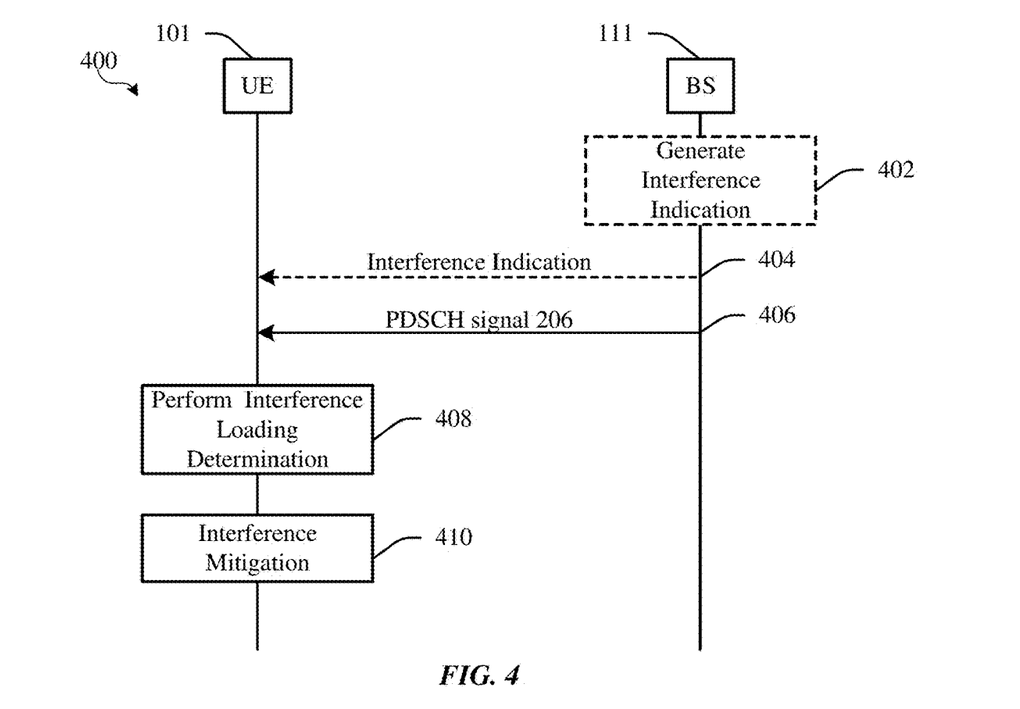
FIG. 4 is a signal flow diagram outlining an example of inter-cell interference mitigation by advanced processing of the target user equipment (UE) to autonomously mitigate an interfering signal.

FIG. 4 is a signal flow diagram 400 outlining an example of inter-cell interference mitigation by advanced processing of the target UE 101 to autonomously mitigate an interfering signal. In the signal flow diagram 400, a target UE 101 performs an interference loading determination used to mitigate the interfering signal. In some aspects, the interfering signal can be the interfering PDSCH transmission 208 as described previously. A time resource allocation of the interfering signal can be different than a time resource allocation of the PDSCH transmission 206. In this respect, the resource allocation of the PDSCH transmission 206 and interfering signal result in un-even interference. In other aspects, the resource allocation of the PDSCH transmission 206 and interfering signal result in even interference.

The BS 111 can coordinate with a NW (e.g. RAN 110, CN 120 of FIG. 1) to determine that a resource allocation of the interfering signal interferes with the PDSCH transmission 206. At 402, the BS 111 can generate an interference indication that indicates to the target UE 101 that the target UE 101 will perform advanced UE processing to mitigate the interfering signal without network assistance. At 404 the BS 111 transmits the interference indication to the target UE 101. In some aspects, the interference indication is carried by a RRC message or DCI. After receiving the interference indication, the target UE 101 can determine to perform advanced processing to mitigate the interfering signal. In other aspects, the target UE 101 can determine to perform advanced processing to mitigate the interfering signal without the interference indication from the BS 111.

At 406 the BS 111 transmits and the target UE 101 receives the PDSCH transmission 206. If the interference indication is configured, the PDSCH transmission 206 can be transmitted by the BS 111 before, during, or after the interference indication is transmitted by the BS 111. After receiving the PDSCH transmission 206 the target UE 101 can determine to perform an interference loading determination at 408. The interference loading determination can be based on the signals available at each symbol location of the PDSCH transmission 206. Furthermore, the target UE 101 can perform various measurement and spectrum characteristic procedures to determine the interference at each symbol and/or PRB of the PDSCH transmission 206. Subsequently, the target UE 101 can perform suitable interference and noise covariance estimation. Aspects of the interference and noise covariance estimation can include features described at 312 of FIG. 3. Finally, the target UE 101 performs mitigation of the interfering signal at 410 based on the interference and noise covariance estimation. Aspects of the mitigation can include features described at 314 of FIG. 3.

In conclusion of 410, the target UE 101 performs advanced processing to autonomously mitigate an interfering signal associated with the PDSCH transmission 206 thereby improving the signal quality of the PDSCH transmission 206.

Figure 5:
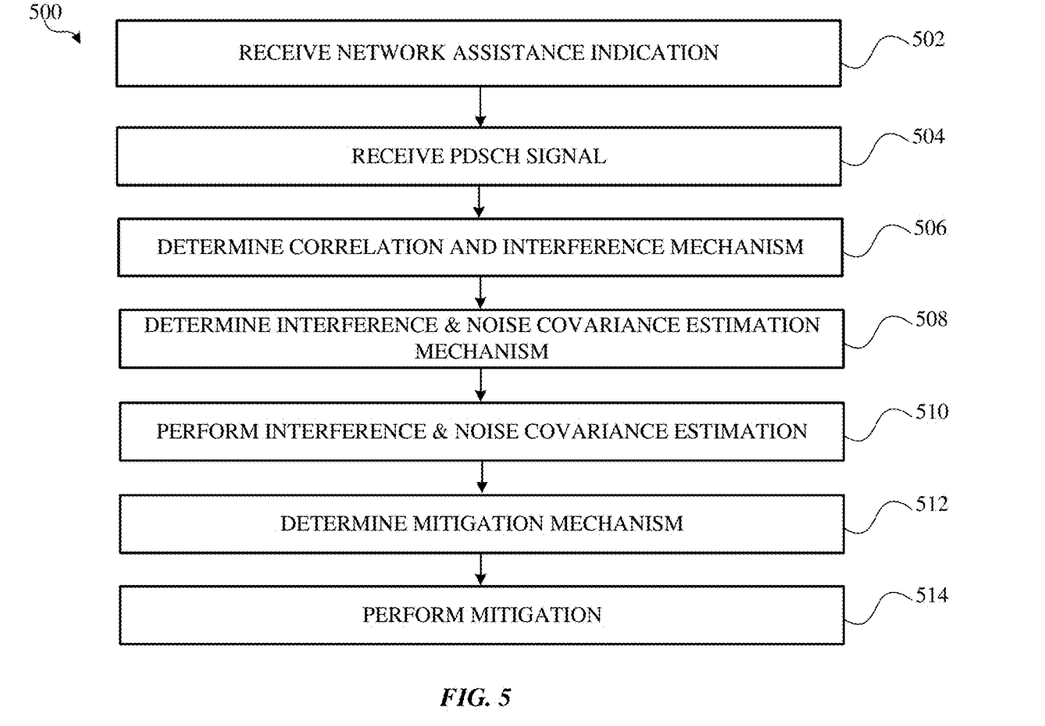
FIG. 5 illustrates a flow diagram of an example method for network assisted inter-cell interference mitigation.

FIG. 5 illustrates a flow diagram of an example method 500 for network assisted inter-cell interference mitigation. The example method 600 may be performed, for example by the UE 101 of FIGS. 1-3.

At 502, the method includes receiving a network assistance indication for the target UE to use in mitigating an interfering signal that interferes with a PDSCH transmission for the target UE. FIG. 2, and FIG. 3 at 306 correspond to some aspects of act 502.

At 504, the method includes receiving a PDSCH transmission. FIG. 3 at 308 corresponds to some aspects of act 504.

At 506, the method includes determining correlation and interference mechanisms associated with the interfering signal. FIG. 3 at 310 corresponds to some aspects of act 506.

At 508, the method includes determining an interference and noise covariance estimation mechanism. FIG. 3 at 312 corresponds to some aspects of act 508.

At 510, the method includes performing interference and noise covariance estimation based on the interference and noise covariance estimation mechanism. FIG. 3 at 312 corresponds to some aspects of act 510.

At 512, the method includes determining a mitigation mechanism based on the interference and noise covariance estimation. FIG. 3 at 314 correspond to some aspects of act 512.

At 514, the method includes performing mitigation of the interfering signal based on the mitigation mechanism. FIG. 3 at 314 correspond to some aspects of act 514.

Figure 6:
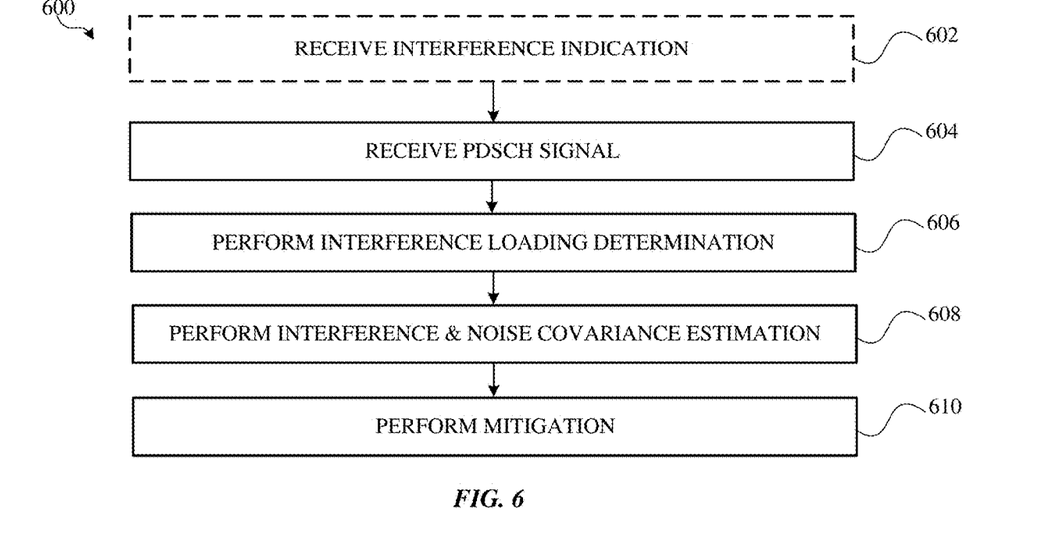
FIG. 6 illustrates a flow diagram of an example method for inter-cell interference mitigation by advanced processing of the target user equipment (UE) to mitigate an interfering signal.

FIG. 6 illustrates a flow diagram of an example method 600 for inter-cell interference mitigation by advanced processing of the target UE 101 to mitigate an interfering signal. The example method 600 may be performed, for example by the UE 101 of FIGS. 1, 2, and 4.

At 602, the method includes optionally receiving an interference indication. FIG. 4 at 404 corresponds to some aspects of act 602.

At 604, the method includes receiving a PDSCH transmission. FIG. 4 at 406 corresponds to some aspects of act 604.

At 606, the method includes performing interference loading determination of the PDSCH transmission resources. FIG. 4 at 408 corresponds to some aspects of act 606.

At 608, the method includes performing interference and noise covariance estimation based on the interference loading determination. FIG. 4 at 408 corresponds to some aspects of act 608.

At 610, the method includes performing mitigation of the interfering signal based on the interference and noise covariance estimation. FIG. 4 at 410 corresponds to some aspects of act 610.

Figure 7:
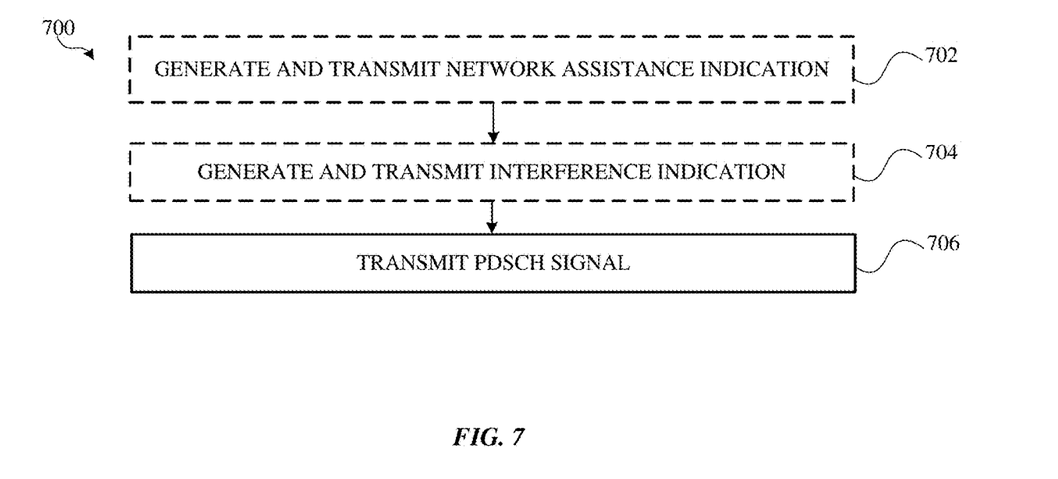
FIG. 7 illustrates a flow diagram of an example method for inter-cell interference mitigation to mitigate an interfering signal.

FIG. 7 illustrates a flow diagram of an example method 700 for inter-cell interference mitigation to mitigate an interfering signal. The example method 700 may be performed, for example by the BS 111 of FIGS. 1-4.

At 702, the method includes generating and transmitting a network assistance indication for the use of mitigating a signal that interferes with a PDSCH transmission. FIG. 2, and FIG. 3 at 302 and 306 correspond to some aspects of act 702.

At 704, the when the method does not include the features of 702, the method includes generating and transmitting an interference indication to indicate that a signal that interferes with a PDSCH transmission needs to be mitigated. FIG. 2, and FIG. 4 at 402 and 404 correspond to some aspects of act 704.

At 706, the method includes transmitting a PDSCH transmission. FIG. 4 at 406 corresponds to some aspects of act 706.

Figure 8:
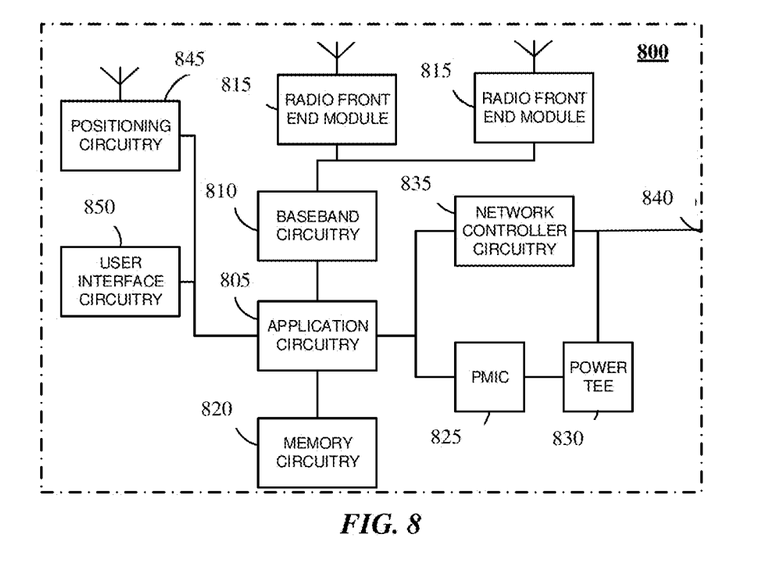
FIG. 8 illustrates an example of an infrastructure equipment, in accordance with various aspects disclosed.

FIG. 8 illustrates an example of infrastructure equipment 800 in accordance with various aspects. The infrastructure equipment 800 (or "system 800") may be implemented as a base station, radio head, RAN node such as the BS 111 of FIG. 1 and/or any other element/device discussed herein. In other examples, the system 800 could be implemented in or by a UE such as UE 101.

The system 800 includes application circuitry 805, baseband circuitry 810, one or more radio front end modules (RFEMs) 815, memory circuitry 820 (including a memory interface), power management integrated circuitry (PMIC) 825, power tee circuitry 830, network controller circuitry 835, network interface connector 840, satellite positioning circuitry 845, and user interface 850. In some aspects, the device 800 may include additional elements such as, for example, memory/storage, display, camera, sensor, or input/output (I/O) interface. In other aspects, the components described below may be included in more than one device. For example, said circuitries may be separately included in more than one device for CRAN, vBBU, or other like implementations.

Application circuitry 805 includes circuitry such as, but not limited to one or more processors (or processor cores), processing circuitry, cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 805 may be coupled with or may include memory/storage elements and may be configured to execute instructions stored in the memory/storage to enable various applications or operating systems to run on the system 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 805 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some aspects, the application circuitry 805 may comprise, or may be, a special-purpose processor/controller to operate according to the various aspects herein. As examples, the processor(s) of application circuitry 805 may include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some aspects, the system 800 may not utilize application circuitry 805, and instead may include a special-purpose processor/controller to process IP data received from an EPC or 5GC, for example.

User interface circuitry 850 may include one or more user interfaces designed to enable user interaction with the system 800 or peripheral component interfaces designed to enable peripheral component interaction with the system 800. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The components shown by FIG. 8 may communicate with one another using interface circuitry, that is communicatively coupled to one another, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 9:
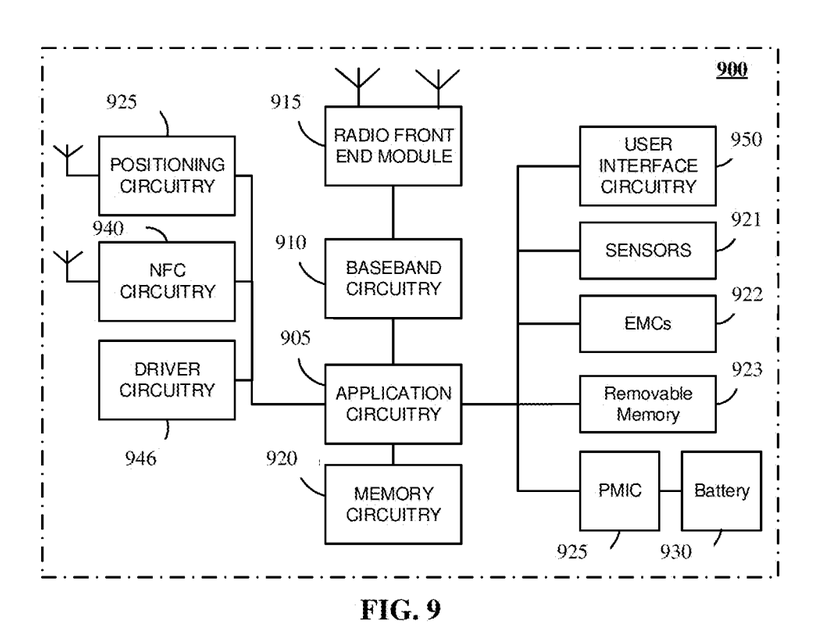
FIG. 9 illustrates an example of a user equipment (UE) or base station (BS) platform, in accordance with various aspects disclosed.

FIG. 9 illustrates an example of a platform 900 (or "device 900") in accordance with various aspects. In aspects, the computer platform 900 may be suitable for use as the UE 101 of FIG. 1, and/or any other element/device discussed herein such as the BS 111 of FIG. 1. The platform 900 may include any combinations of the components shown in the example. The components of platform 900 may be implemented as integrated circuits (ICs), portions thereof, discrete electronic devices, or other modules, logic, hardware, software, firmware, or a combination thereof adapted in the computer platform 900, or as components otherwise incorporated within a chassis of a larger system. The block diagram of FIG. 9 is intended to show a high level view of components of the computer platform 900. However, some of the components shown may be omitted, additional components may be present, and different arrangement of the components shown may occur in other implementations.

Application circuitry 905 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 905 may be coupled with or may include memory/storage elements and may be configured to execute instructions stored in the memory/storage to enable various applications or operating systems to run on the system 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 905 may include a general or special purpose processor, such as an A-series processor (e.g., the A13 Bionic), available from Apple® Inc., Cupertino, CA or any other such processor. The processors of the application circuitry 905 may also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 905 may be a part of a system on a chip (SoC) in which the application circuitry 905 and other components are formed into a single integrated circuit, or a single package.

The baseband circuitry or processor 910 may be implemented, for example, as a solder-down substrate including one or more integrated circuits, a single packaged integrated circuit soldered to a main circuit board or a multi-chip module containing two or more integrated circuits. Furthermore, the baseband circuitry or processor 910 may cause transmission of various resources.

The platform 900 may also include interface circuitry (not shown) that is used to connect external devices with the platform 900. The interface circuitry may communicatively couple one interface to another. The external devices connected to the platform 900 via the interface circuitry include sensor circuitry 921 and electro-mechanical components (EMCs) 922, as well as removable memory devices coupled to removable memory circuitry 923.

A battery 930 may power the platform 900, although in some examples the platform 900 may be mounted deployed in a fixed location, and may have a power supply coupled to an electrical grid. The battery 930 may be a lithium ion battery, a metal-air battery, such as a zinc-air battery, an aluminum-air battery, a lithium-air battery, and the like. In some implementations, such as in V2X applications, the battery 930 may be a typical lead-acid automotive battery.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium using instructions stored in a memory. Many other examples and variations are possible within the scope of the claimed disclosure.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units. The processor or baseband processor can be configured to execute instructions described herein.

A UE or a BS, for example the UE 101 or BS 111 of FIG. 1 can comprise a memory interface and processing circuitry communicatively coupled to the memory interface configured to execute instructions described herein.

Examples (aspects) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to aspects and examples described herein.

Example 1 is a baseband processor of a user equipment (UE), comprising: one or more processors configured to: receive a network assistance indication associated with an interfering signal, wherein the interfering signal interferes with a physical downlink shared channel (PDSCH) transmission, wherein a time resource allocation of the interfering signal is different than a time resource allocation of the PDSCH transmission; determine an interference and noise covariance estimation mechanism based on the network assistance indication; perform interference and noise covariance estimation based on the noise covariance estimation mechanism; and perform mitigation of the interfering signal using a mitigation mechanism based on the interference and noise covariance estimation.

Example 2 can include Example 1, further configured to correlate a resource allocation of the interfering signal with a resource allocation of the PDSCH transmission based on the network assistance indication before determining the interference and noise covariance estimation mechanism.

Example 3 can include Example 2, wherein the correlation includes one or more of frequency resource correlation or time resource correlation, and wherein the correlation further includes correlating symbols of the PDSCH transmission to overlapping resource allocation of the interfering signal.

Example 4 can include Example 1, wherein network assistance indication is carried by a radio resource control (RRC) message or a downlink control information.

Example 5 can include Example 1, wherein the interfering signal is an interfering PDSCH transmission.

Example 6 can include Example 1, wherein the network assistance indication is associated with a time domain resource assignment (TDRA) of the interfering signal or a TDRA and frequency domain resource allocation (FDRA) of the interfering signal.

Example 7 can include Example 1, wherein the interference and noise covariance estimation mechanism is one or more of demodulation reference signal (DMRS) based or data based.

Example 8 can include Example 7, wherein the interference and noise covariance estimation mechanism is DMRS based when a DMRS resource element (RE) associated with the PDSCH transmission overlaps with the interfering signal.

Example 9 can include Example 7, wherein the interference and noise covariance estimation mechanism is data based when a PDSCH resource element (RE) associated with the PDSCH transmission overlaps with the interfering signal.

Example 10 can include any of Examples 1-9, wherein the interference and noise estimation includes: determining interference levels for symbols of the PDSCH transmission; and further configured to: perform mitigation of the interfering signal when the interference levels satisfy an interference threshold.

Example 11 can include any of Examples 1-9, wherein the mitigation includes performing interference rejection on resource elements (REs) or subcarriers that overlap with the interfering signal.

Example 12 can include any of Examples 1-9, wherein the interference and noise estimation includes: determining an interference loading of symbols or subcarriers associated with the PDSCH transmission; and further configured to: perform mitigation by using a same noise covariance matrix for symbols or subcarriers associated with the PDSCH transmission that overlap with the interfering signal when the interference loading satisfies an interference loading threshold.

Example 13 can include any of Examples 1-9, wherein the network assistance indication further indicates one or more of a channel state information interference mitigation (CSI-IM) resource, a phase tracking reference signal (PT-RS), a demodulation reference signal (DMRS), or a blank resource element (RE).

Example 14 can include Examples 1, wherein the network assistance indication further indicates a channel state information interference mitigation (CSI-IM) resource associated with a slot of the interfering signal.

Example 15 can include Examples 1, wherein the network assistance indication further indicates a channel state information interference mitigation (CSI-IM) resource associated with symbols of the interfering signal that overlap with the PDSCH transmission.

Example 16 can include Examples 1, wherein the network assistance indication further indicates a phase tracking reference signal (PT-RS) associated with symbols of the interfering signal that overlap with the PDSCH transmission.

Example 17 can include Examples 16, wherein the PT-RS is configured for frequency range 1 (FR1).

Example 18 can include Examples 1, wherein the network assistance indication further indicates a demodulation reference signal (DMRS) configured for each symbol of the PDSCH transmission that overlap with the interfering signal.

Example 19 can include Examples 1, wherein the network assistance indication further indicate blank resource elements (REs) that assist with the interference and noise covariance estimation.

Example 20 can include Examples 19, wherein the blank REs are associated with subframes or symbols of the PDSCH transmission that overlap with the interfering signal.

Example 21 is a baseband processor of a base station (BS), comprising: one or more processors configured to: determine that an interfering signal interferes with a PDSCH transmission; generate a network assistance indication associated with an interfering signal, wherein a time resource allocation of the interfering signal is different than a time resource allocation of the PDSCH transmission; and transmit the network assistance indication.

Example 22 can include Examples 21, wherein the network assistance indication is transmitted in a radio resource control (RRC) message or a downlink control information (DCI).

Example 23 can include Examples 21, wherein the network assistance indication further includes a time domain resource assignment (TDRA) of the interfering signal or a TDRA and frequency domain resource allocation (FDRA) of the interfering signal.

Example 24 can include Examples 21, wherein the network assistance indication is used by a user equipment (UE) for interference and noise mitigation of the interfering signal.

Example 25 can include any of Examples 21-24, further configured to configure a channel state information interference mitigation (CSI-IM) associated with a slot of the interfering signal that overlaps with the PDSCH transmission.

Example 26 can include any of Examples 21-24, further configured to configure a channel state information interference mitigation (CSI-IM) resource associated with symbols of the PDSCH transmission that overlap with the interfering signal.

Example 27 can include any of Examples 21-24, further configured to configure a phase tracking reference signal (PT-RS) associated with symbols of the interfering signal that overlap with the PDSCH transmission.

Example 28 can include any of Examples 21-24, further configured to configure blank resource elements (REs) that overlap with subframes or symbols of the interfering signal and also overlap with subframes or symbols of the PDSCH transmission; and generate a radio resource control (RRC) message comprising the blank REs.

Example 29 is a user equipment (UE), comprising: a memory interface; and processing circuitry communicatively coupled to the memory interface and configured to: determine to perform an interference loading determination of each symbol of a physical downlink shared channel (PDSCH) transmission; perform interference and noise covariance estimation based on the interference loading determination that identifies interference that overlaps with the PDSCH transmission; and perform mitigation of interference that overlaps with the PDSCH transmission.

Example 30 can include Example 29, wherein the interference loading determination includes a spectrum characteristic procedure to determine the interference at each symbol and physical resource block (PRB) of the PDSCH transmission.

Example 31 can include any of Examples 29-30, further configured to: receive an interference indication that indicates an interfering signal that overlaps with the PDSCH transmission; and determine to perform the interference loading determination based on the interference indication.

A method as substantially described herein with reference to each or any combination substantially described herein, comprised in examples 1-31, and in the Detailed Description.

A non-transitory computer readable medium as substantially described herein with reference to each or any combination substantially described herein, comprised in examples 1-31, and in the Detailed Description.

A wireless device configured to perform any action or combination of actions as substantially described herein, comprised in examples 1-31, and in the Detailed Description.

An integrated circuit configured to perform any action or combination of actions as substantially described herein, comprised in examples 1-31, and in the Detailed Description.

An apparatus configured to perform any action or combination of actions as substantially described herein, comprised in examples 1-31, and in the Detailed Description.

A baseband processor configured to perform any action or combination of actions as substantially described herein, comprised in examples 1-31, and in the Detailed Description.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communication media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal or apparatus.

In this regard, while the disclosed subject matter has been described in connection with various aspects and corresponding Figures, where applicable, it is to be understood that other similar aspects can be used or modifications and additions can be made to the described aspects for performing the same, similar, alternative, or substitute function of the disclosed subject matter without deviating therefrom. Therefore, the disclosed subject matter should not be limited to any single aspect described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

The present disclosure is described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable or non-transitory computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A baseband processor of a user equipment (UE), comprising:
   one or more processors configured to:
      receive a network assistance indication associated with an interfering signal, wherein the interfering signal interferes with a physical downlink shared channel (PDSCH) transmission,
         wherein a time resource allocation of the interfering signal is different than a time resource allocation of the PDSCH transmission;
      determine, based on the network assistance indication, an interference and noise covariance estimation mechanism that has a type of interference that is demodulation reference signal (DMRS) based or data based, and
      perform interference and noise covariance estimation based on the interference and noise covariance estimation mechanism, wherein the interference and noise covariance estimation is performed differently for the type of interference that is DMRS based relative to the type of interference that is data based; and
      perform mitigation of the interfering signal using a mitigation mechanism based on the interference and noise covariance estimation.

2. The baseband processor of claim 1, further configured to correlate a resource allocation of the interfering signal with a resource allocation of the PDSCH transmission based on the network assistance indication before determining the interference and noise covariance estimation mechanism.

3. The baseband processor of claim 2, wherein the correlation includes one or more of frequency resource correlation or time resource correlation, and wherein the correlation further includes correlating symbols of the PDSCH transmission to overlapping resource allocation of the interfering signal.

4. The baseband processor of claim 1, wherein the network assistance indication is carried by a radio resource control (RRC) message or a downlink control information.

5. The baseband processor of claim 1, wherein the interfering signal is an interfering PDSCH transmission.

6. The baseband processor of claim 1, wherein the network assistance indication includes frequency domain resource allocation (FDRA) data of the interfering signal.

7. The baseband processor of claim 1, wherein the interference and noise covariance estimation mechanism is determined based on both a pattern of the interfering signal and a time/frequency characteristic of the interfering signal.

8. The baseband processor of claim 1, further comprising:
   determining the interference and noise covariance estimation mechanism is DMRS based when a DMRS resource element (RE) associated with the PDSCH transmission overlaps with the interfering signal; and
   performing the interference and noise covariance estimation to include determining interference levels for every physical resource block (PRB) or symbol of the PDSCH transmission.

9. The baseband processor of claim 1, further comprising:
   determining the interference and noise covariance estimation mechanism is data based when a PDSCH resource element (RE) associated with the PDSCH transmission overlaps with the interfering signal; and
   performing the interference and noise covariance estimation includes determining an interference loading of one or more of symbols, physical resource blocks (PRBs), or subcarriers of the PDSCH transmission.

10. The baseband processor of claim 1, wherein the interference and noise estimation includes:
determining interference levels for symbols of the PDSCH transmission; and further configured to:
perform mitigation of the interfering signal when the interference levels satisfy an interference threshold.

11. The baseband processor of claim 1, wherein the mitigation includes performing interference rejection on resource elements (REs) or subcarriers that overlap with the interfering signal.

12. The baseband processor of claim 1, wherein the interference and noise estimation includes:
determining an interference loading of symbols or subcarriers associated with the PDSCH transmission; and further configured to:
perform mitigation by using a same noise covariance matrix for symbols or subcarriers associated with the PDSCH transmission that overlap with the interfering signal when the interference loading satisfies an interference loading threshold.

13. The baseband processor of claim 1, wherein the network assistance indication further indicates a channel state information interference mitigation (CSI-IM) resource, a phase tracking reference signal (PT-RS), and a demodulation reference signal (DMRS).

14. A method for a base station (BS), the method comprising:
determining that an interfering signal interferes with a PDSCH transmission;
generating a network assistance indication associated with the interfering signal,
wherein a time resource allocation of the interfering signal is different than a time resource allocation of the PDSCH transmission; and
transmitting the network assistance indication, wherein the network assistance indication is used to determine an interference and noise covariance estimation mechanism that is demodulation reference signal (DMRS) based interference or data based interference, and wherein the network assistance indication is used to perform interference and noise covariance estimation differently for the DMRS based interference relative to the data based interference.

15. The method of claim 14, wherein the network assistance indication is transmitted in a radio resource control (RRC) message or a downlink control information (DCI).

16. The method of claim 14, wherein the network assistance indication includes frequency domain resource allocation (FDRA) data of the interfering signal.

17. The method of claim 14, wherein the network assistance indication is used by a user equipment (UE) for interference and noise mitigation of the interfering signal.

18. A user equipment (UE), comprising:
a memory interface; and
processing circuitry communicatively coupled to the memory interface and configured to:
receive a network assistance indication associated with an interfering signal, wherein the interfering signal interferes with a physical downlink shared channel (PDSCH) transmission,
wherein a time resource allocation of the interfering signal is different than a time resource allocation of the PDSCH transmission;
determine, based on the network assistance indication, an interference and noise covariance estimation mechanism, that has a type of interference that is demodulation reference signal (DMRS) based or data based, and;
perform interference and noise covariance estimation based on the interference and noise covariance estimation mechanism, wherein the interference and noise covariance estimation is performed differently for the type of interference that is DMRS based relative to the type of interference that is data based; and
perform mitigation of the interfering signal using a mitigation mechanism based on the interference and noise covariance estimation.

19. The UE of claim 18, wherein the network assistance indication further indicates a channel state information interference mitigation (CSI-IM) resource associated with a slot of the interfering signal.

20. The UE of claim 18, wherein the network assistance indication further indicates a channel state information interference mitigation (CSI-IM) resource associated with symbols of the interfering signal that overlap with the PDSCH transmission.

21. The UE of claim 18, wherein the network assistance indication further indicates a phase tracking reference signal (PT-RS) associated with symbols of the interfering signal that overlap with the PDSCH transmission.

22. The UE of claim 21, wherein the PT-RS is configured for frequency range 1 (FR1).

23. The UE of claim 18, wherein the network assistance indication further indicates a demodulation reference signal (DMRS) configured for each symbol of the PDSCH transmission that overlap with the interfering signal.

24. The UE of claim 18, wherein the network assistance indication further indicate blank resource elements (REs) that assist with the interference and noise covariance estimation.

25. The UE of claim 24, wherein the blank REs are associated with subframes or symbols of the PDSCH transmission that overlap with the interfering signal.

26. A base station (BS), comprising:
a memory interface; and
processing circuitry communicatively coupled to the memory interface and configured to:
determine that an interfering signal interferes with a PDSCH transmission;
generate a network assistance indication associated with the interfering signal,
wherein a time resource allocation of the interfering signal is different than a time resource allocation of the PDSCH transmission; and
transmit, by a radio frequency (RF) circuitry, the network assistance indication, wherein the network assistance indication is used to determine an interference and noise covariance estimation mechanism that is demodulation reference signal (DMRS) based interference or data based interference, and wherein the network assistance indication is used to perform interference and noise covariance estimation differently for the DMRS based interference relative to the data based interference.

27. The BS of claim 26, further configured to configure a channel state information interference mitigation (CSI-IM) associated with a slot of the interfering signal that overlaps with the PDSCH transmission.

28. The BS of claim 26, further configured to configure a channel state information interference mitigation (CSI-IM)

resource associated with symbols of the PDSCH transmission that overlap with the interfering signal.

29. The BS of claim 26, further configured to configure a phase tracking reference signal (PT-RS) associated with symbols of the interfering signal that overlap with the PDSCH transmission.

30. The BS of claim 26, further configured to configure blank resource elements (REs) that overlap with subframes or symbols of the interfering signal and also overlap with subframes or symbols of the PDSCH transmission; and
   generate a radio resource control (RRC) message comprising the blank REs.

* * * * *